United States Patent Office 3,684,724
Patented Aug. 15, 1972

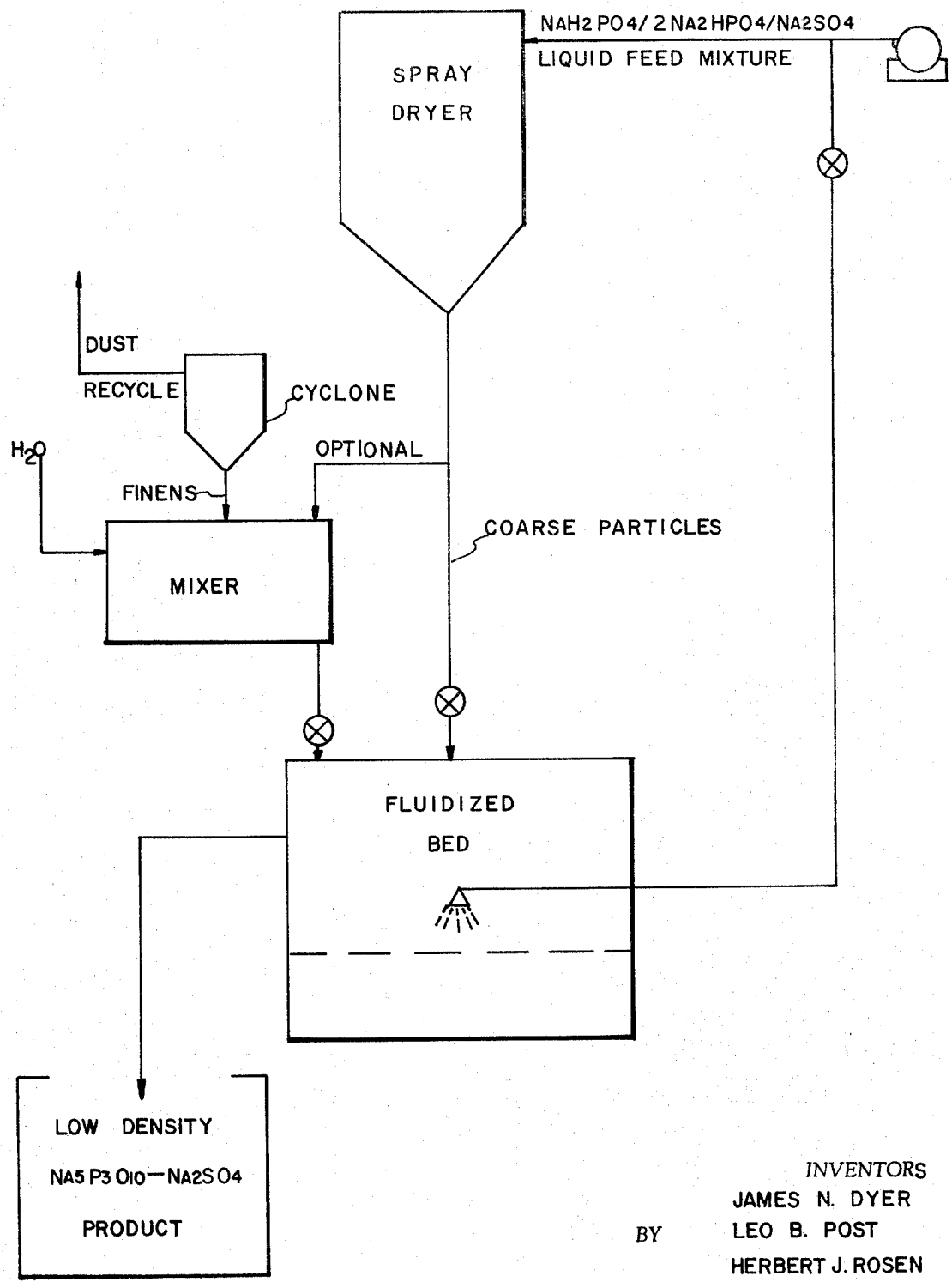

3,684,724
PROCESS FOR MAKING MIXTURES OF SODIUM POLYPHOSPHATES AND SODIUM SULFATE
James N. Dyer and Leo B. Post, New City, and Herbert J. Rosen, Yonkers, N.Y., assignors to Stauffer Chemical Company, New York, N.Y.
Continuation-in-part of application Ser. No. 857,393, Sept. 12, 1969. This application Apr. 20, 1970, Ser. No. 30,201
The portion of the term of the patent subsequent to Mar. 21, 1989, has been disclaimed
Int. Cl. C01b 25/38; C11d 3/06, 7/16
U.S. Cl. 252—135
9 Claims

ABSTRACT OF THE DISCLOSURE

Mixtures of sodium sulfate and sodium polyphosphates, particularly, sodium tripolyphosphates are prepared in low bulk density, high relatively non-frangible, granular yields by spray drying an aqueous solution of monosodium/disodium orthophosphate salts having an $Na_2O:P_2O_5$ ratio of from 1 to 2, and sodium sulfate in combinations of 10% to 90%, hydrating the spray dried product or the fines to a LOI of between about 10% and about 50% and intermolecularly dehydrating the hydrated product in a fluidized converter at a temperature of between about 200° C. and 500° C. to provide the desired product. The product of the process is useful as a detergent builder.

RELATED APPLICATIONS

This application is a continuation-in-part of copending application Ser. No. 857,393 filed Sept. 12, 1969.

BACKGROUND OF THE INVENTION

The present invention relates to a process for preparing mixtures of sodium sulfate and sodium polyphosphates in a fluidized bed from a conditioned feed mixture of sodium orthophosphates and sodium sulfate which has been processed to furnish a low bulk density product upon molecular or intermolecular dehydration. In particular, the present invention relates to a process for preparing mixtures of sodium sulfate and sodium polyphosphates in at least 90% granular product form from a fluidized bed reactor.

Numerous sodium phosphates, e.g., sodium tripolyphosphates, are available commercially, each tailored to suit at least one particular domestic or industrial use. These products are prepared by converting mixtures of phosphate salts at elevated temperatures to the desired product as illustrated by the following reaction scheme for preparing sodium tripolyphosphate:

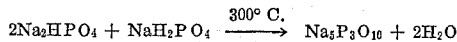
$$2Na_2HPO_4 + NaH_2PO_4 \xrightarrow{300°\ C.} Na_5P_3O_{10} + 2H_2O$$

The reaction proceeds well at temperatures above 300° C. though temperatures as low as 200° C. and as high as 500° C. can be used. The two reactants ($Na_2HP_4$ and $NaH_2PO_4$) or ortho salts are generally prepared by admixing sodium carbonate with phosphoric acid in an aqueous medium. Close control is required during this reaction to insure an almost exact 2:1 ratio of di:mono sodium ortho phosphate salt. Variations in the ratio of di:mono sodium ortho phosphate lead to the formation of sodium pyrophosphate and sodium metaphosphate. Unreacted sodium carbonate can cause formation of further impurities. The purity and close intermingling of the ortho salts at the time conversion to the sodium phosphates is necessary to provide the desired final product. The proper preparation of the reaction feed mixture is essential to providing a proper final product.

In addition to the chemical product itself, care is also given to the final physical form of the product. There are commercially available today sodium phosphates in a number of densities, each tailored to suit a particular use or uses. The so-called "light density" sodium tripolyphosphates which are commercially available (usually twenty-five to forty pounds per cubic foot) find major application as detergent builders where a fast rate of solution is desired; or to provide a porous absorptive particle as a carrier for other ingredients such as enzymes, surface active agents and the like; or to provide bulk to a product; or in certain types of detergent tablets. The density of any condensed sodium phosphate is normally fixed within limits of the process selected for its preparation. The "light density" sodium tripolyphosphates are often produced by flash drying, a liquid feed, e.g., in spray drying equipment and conducting the spray dried material into a calciner for conversion into the sodium tripolyphosphate. Several difficulties have arisen with this process. The dried product from the spray drier is characterized by an extremely wide range of particle sizes ranging from dust to coarse particles. The calciner is limited in its ability to agglomerate or in any way assist in reducing the amount of small particles in the final product. The small particles or fines and dust must be separated and either recycled or sold as a separate powder product. Due to present market conditions, an economical process requires the use of the fines and dust. The market for this powdered product has dwindled extensively in the past few years so that the fines and dust of the process are extremely undesirable. Workers in the prior art have attempted to overcome this problem by the process outlined in the U.S. Patent of Post et al., 3,382,036, issued May 7, 1968. In this process, a dry, crystalline feed mixture of orthophosphate salts is introduced into a dehydrator to remove the water of hydration from the salts. The product of the dehydrator is milled, rehydrated, remilled to a preferred loss on ignition (LOI) of between about 14% to about 18%, and then introduced into a fluidized bed in order to provide a low density sodium tripolyphosphate product. In the process using regular milled salts from well defined crystals of mono and disodium phosphate, agglomeration proceeds along with conversion in the fluidized bed reactor. Water from the crystals is released slowly causing a tacky condition to exist for several minutes. The release of water in the conversion induces a tacky stage which allows the feed particles to adhere to the tripolyphosphate particles in the fluid bed and in this manner produces a coarse granular product. However, the desirability of this process is reduced by the requirement of the numerous milling steps. Also, the product of the Post et al. patent is highly frangible, tending to break down during transportation due to the rubbing of the particles together or with the walls of the transport means. This tends to produce fines which are undesirable in some areas of use. It has now been found that these disadvantages can be overcome by proceeding in accordance with the present invention.

The use of phosphates as detergent builders has recently been questioned from the standpoint of possible contribution to pollution problems in lakes and streams. One way of reducing phosphate content of detergent mixes is to replace a portion of the phosphate content with sodium sulfate. Unfortunately, crystalline sodium sulfate has a high density of about 70 lbs./ft.³ and will segregate when mechanically mixed with desirable granular forms of sodium tripolyphosphates. The present invention overcomes and eliminates these inherent disadvantages and problems.

THE INVENTION

In accordance with the process of present invention, granular admixtures of sulfates and phosphates salts are produced by dehydrating an aqueous solution of sodium sulfate and orthophosphate salts selected from the group consisting of monosodiumphosphate monohydrate, disodiumphosphate duohydrate and mixtures thereof. Such mixtures have an $Na_2O:P_2O_5$ ratio of from about 1 to about 2 exclusive of the amount of sodium sulfate which is present. Most preferably the $Na_2O:P_2O_5$ ratio is about 1.67. The most preferred method of dehydration in accordance with the present invention comprises spray drying as more fully hereinafter described. The dehydrated or spray dried material is then hydrated with water to provide a conditioned feed having a loss on ignition of between about 10 and about 50%. The spray dried product is preferably hydrated to a loss on ignition from about 15 to about 20%. The conditioned feed is then passed to a suitable intermolecular dehydration zone to produce the relatively low density granular product of the present invention. The most preferred intermolecular dehydration zone comprises a fluidized bed.

The product of the process of this invention is a granular material which is relatively nonfrangible as compared with products prepared by prior art methods.

In a preferred embodiment of the present invention the conditioned feed is prepared by taking the spray dried feed of orthophosphate salts and sodium sulfate and separating out a substantial portion of the fine particles of the spray dried product, hydrating the fine particles with water to an LOI of between about 10 and about 50% by weight and recombining the hydrated spray dried particles with the coarse spray dried particles to provide the conditioned feed. After conditioning, the feed is preferably fed to a fluidized bed for conversion into the sodium-polyphosphate-sodiumsulfate granules in a manner described in the prior art.

Although the present process is not dependent upon theoretical considerations for operability, it is believed that hydration of the spray dried orthophosphate sodium sulfate feed salts causes an agglomeration of the fine particles in the hydration stage. In the fluid bed, the spray dried particles convert rapidly and the water from these particles evaporates quickly. Tackiness is brief due to porosity of these particles and the small cluster of crystals that form through rapid instantaneous evaporation. Spray dried particles are spherical and provide a minimum of surface area whereas other particles such as the milled salt provides a greater surface area to allow greater contact with one another. Spray dried particles tend to pass through the fluidized bed converter with little change in particle size. The present invention is based on the finding that by hydration of the spray dried ortho-sulfate salts prior to conversion, agglomeration is markedly improved apparently by providing water of hydration as a means of dissolving mono- and di-sodium phosphate for conversion to sodium tripolyphosphate while being intimately associated with sodium sulfate and creating a slower release of water during the conversion.

DESCRIPTION OF DRAWING

Referring now to the drawing, there is set forth a preferred embodiment of the process of the present invention for producing granular mixtures of sodium sulfate tripolyphosphate (hereinafter alternatively STPP). The present invention will be illustrated with regard to the preparation of STPP sodium sulfate 50:50 mix although a wide range of product mixtures can can be readily prepared in accordance with the present invention In the drawing there is shown a spray drier to which is fed a liquid feed mixture of sodium orthophosphate and sulfate salts having the approximate mixture of two parts disodium phosphate for each one part monosodium phosphate and three parts of sodium sulfate by weight. Any type of standard spray drying equipment can be utilized though large diameter spray driers are preferred. The spray drier can use either the rotating disc atomizer or the spray nozzle atomizer, though the former is preferred. The liquid feed mixture can contain any concentration of the sodium ortho phosphate and sulfate salts although it is preferred that the solution be as concentrated as possible so that a limited amount of water has to be removed in the spray drying operation. Upper limits on concentration are dictated by the ability of the solution to pass through the nozzle of the spray drier, or be effectively atomized by the rotary disc. Practical solids concentration for drying efficiency are preferably maintained within the range of from about 30% to about 55%, though it is more preferred to maintain the solids content within the range of from about 35% to about 45%.

The spray drier is operated at drying or inlet temperatures of from about 150° C. and 500° C. though preferably at temperatures of between 350° C. and 450° C. The spray drier is operated at outlet temperatures of from about 110° C. to about 250° C. and preferably from about 130° C. to about 160° C. Surface temperatures of the product of above about 175° C. are to be avoided inasmuch as anhydrous monosodium phosphate and disodium phosphate are molecularly dehydrated to form, respectively, sodium acid pyrophosphate and tetrasodium pyrophosphate or intermolecularly dehydrated to form sodium tripolyphosphate. The formation of appreciable amounts of these condensed phosphates during the preparation of the feed, (e.g., over 10 to 20% by weight of the total feed) is normally undesirable since they can prevent proper agglomeration of the feed in the later conversion step. Thus, outlet temperatures of above about 175° C. are generally to be avoided. Outlet temperatures can be increased if the residence time of the particles is reduced so that the surface temperature of the particles does not substantially exceed about 175° C.

Following spray drying, the "chamber" product, e.g., the coarse particles which collect at the bottom of the spray driers, is separated from the fines. The coarse particles are conducted directly to the fluidized bed converter for conversion into the sodium sulfate sodium tripolyphosphate combination granules. Fines which are still airborne in the outlet gas stream are conducted to a cyclone where the fine particles are separated from gas stream. Any entrained particles are sent through a scrubber for recycle. The fines which generally comprise a particle size of from 0 to about 150 microns are then conducted into an hydration apparatus for increasing the LOI to an amount of between about 10% to about 50%. The type of apparatus which can be used for hydration can be any unit which provides for mild agitation during the addition of the water to the spray dried fines. A preferred apparatus consists of the rotary drum drier equipped with water sprays and lifter vanes. Such an apparatus aids in the uniformity of hydration and providing continuous operation. To prevent condensation on the hydrator roof and walls it is usually desirable to provide means for drawing fresh air across the agitated bed. It is preferable that the temperature of the mixture to the hydrator be maintained below about 50° C. When a higher temperature is used the mixture may become tacky and difficult to handle during the later operations. Inasmuch as it is desired to have a high LOI and a high porosity product, the cooling of the feed before hydration is advantageous.

In order to effectively agglomerate the cyclone-separated spray dried particles, the LOI of the particles must be increased to at least 18% in the hydrator (for a 50:50 mix). Hydrating the product to over 35% LOI (on a 50:50 mix) provides a feed which tends to be wet and difficult to handle. Porosity can also be lost by the liquification of the orthophosphates and sulfates. The LOI of the conditioned feed can be as high as 50% if an $STPP:Na_2SO_4$ ratio of 10:90 is the desired final product. The LOI should not be greater than 25% if a 90:10 $STPP:Na_2SO_4$ product is desired. The LOI can be as low as 10% if a $STPP:Na_2SO_4$ product of 10:90 is desired; and the LOI should not be less than 15% if an $STPP:Na_2SO_4$ ratio of 90:10 is to be had.

The conditioned feed is then passed directly into the fluidized bed for conversion at a point either above or below the upper level of the bed. In the fluidized bed the temperature is maintained at a temperature between about 200° C. and 500° C. to effect conversion (i.e., molecular or intermolecular dehydration). Dombroveskii, N. M., Russian Journal of Inorganic Chemistry, January, 1962, pp. 47–51. The particles are generally converted with little change in size during the fluid bed reaction. Where desirable, the fluidized bed converter, which constitutes an intermolecular dehydration zone, can be replaced with other types of heating apparatus, such as rotary kilns. The fluidized bed is preferred to other types of apparatus for the manufacture of low density STPP.

The invention will be further illustrated in the example which follows.

Example 1

An aqueous solution of mono sodium phosphate, disodium phosphate, and sodium sulfate is prepared by reacting soda ash, 87% $H_3PO_4$ and 98% sulfuric acid in the stoichiometric quantities necessary to provide a reaction mixture having an $Na_2O:P_2O_5$ ratio of between 1.66 and 1.70 (exclusive of sodium sulfate) and an ultimate 50:50 mixture of sodium sulfate and sodium tripoly phosphate. Water is added to maintain a 35% solids concentration. This solution is then dried in a 32' diameter spray drier using a rotary disc atomizer. The inlet air temperature is about 350° C. and the outlet air temperature is about 150° C. The dry solids (ortho sulfate salts) are then screened through an 80 mesh screen resulting in 50,000 lbs. of plus 80 mesh solids and 30,000 lbs. of through 80 mesh material. The through 80 mesh solids are then sent through a 4' diameter x 20' long rotary drum where 15% water is added to the solids. The moistened orthophosphate and sulfate salts now having an LOI of 18 are then mixed with the dry solids to form the final feed salts. The feed salts are then converted to sodium tripoly phosphate and sodium sulfate at a rate of 12,000 lbs./hr. in a 15 ft. diameter fluid bed reactor. The reactor temperature is 320° C. This results in a 95% yield of product with bulk density of 30.2 lbs./cu. ft. and a particle size distribution between 14 and 80 mesh.

Example 2

An ultimate 50:50 granular mixture (weight basis) of sodium tripolyphosphate and sodium sulfate is prepared by omitting the spray drying step, using only the fluid bed.

Soda ash and phosphoric acid are reacted to form the disodium-monosodium phosphate liquor in the manner set forth in Example 1. The appropriate amount of sodium sulfate is added to make a 50:50 mixture along with water to form a solution with 30% solids (35° Be.' at 70° C.).

The above feed solution is filtered to remove any insolubles and fed directly to the fluid bed. The bed is operated at 320° C. Uniform spherical particles are produced with a particle size distribution between 40 and 80 mesh. The product analyzes 95% tripolyphosphate (in the phosphate portion).

The present process can be advantageously used to produce mixtures of sodium phosphate and sulfates having bulk densities below about 55 lbs./cu. ft. The preferred bulk density is between 25 and 35 lbs./cu. ft. From a practical standpoint, and in part due to particle frangibility, 20 lbs./cu. ft. appears to be about the lowest bulk density possible on a continuous commercial scale.

However, if bulk densities of 35 to 70 lbs./cu. ft. are desirable (with mixtures of 10 to 90% sodium sulfate-sodium tripolyphosphate) these can be readily obtained by spraying a controlled portion of the feed liquor directly into the fluidized bed as shown in the drawing. If all the feed liquor is sprayed into the fluidized bed and no spray dried salts are fed, the maximum density of 70 lbs./cu. ft. can be obtained. The medium bulk density phosphates-sulfates mixture, e.g., those above about 40 lbs./cu. ft., may be useful in applications where it is necessary for the particles to absorb quantities of liquids, e.g., detergent mixtures, etc. Due to the greater porosity of the sodium phosphate sulfate produced from spray dried feed they tend to have greater capacity for absorbing and retaining liqiuds. Lower density sodium phosphates-sulfates mixtures have an even greater porosity and capacity for holding such liquids, and consequently are highly preferable for use in detergent tablets and the like. As indicated hereinbefore, the porosity (bulk density) of the sodium phosphate sulfate produced by the process of the invention is controlled by the conditioning procedure used for the feed. Thus, controlled spray drying along with multiple screenings of the spray dried materials could be used to furnish very low density products.

The mixtures of sodium phosphates and sulfates which can be produced by the present process are those having $Na_2O:P_2O_5$ ratios between 1 and 2, (exclusive of sodium sulfate present) including monosodium phosphate, sodium tripolyphosphate, and tetrasodium pyrophosphate in combination with sodium sulfate from 10 to 90%. Further, any mixtures of two or more of the sodium phosphates with sulfates, e.g., tetrasodium pyrophosphate and sodium tripolyphosphate, are within the scope of the invention. It should be noted that many of the commercially available condensed phosphates may include small amounts, up to about 10–15% by weight, of other phosphates. For instance, the usual commercial STPP will normally contain about 1–10% by weight of sodium metaphosphate, sodium pyrophosphate and sodium orthophosphates. Selection of the proper proportions of mono- and disodium orthophosphates to serve as feed in combination with sodium sulfate to produce any of the sodium phosphates or mixtures thereof will be obvious to those skilled in the art since the product will have the same $Na_2O:P_2O_5$ ratio (exclusive of sodium sulfate present) as the feed. For example, it will be obvious to use two moles of disodium orthophosphate (ratio=2.0) for every mole of tetrasodium pyrophosphate which is to be produced. Also, where a mixture of condensed phosphates is to be produced, a mixture of mono and disodium orthophosphates having the same $Na_2O:P_2O_5$ ratio (exclusive of sodium sulfate present) will provide the desired feed.

It is also important to note that sodium tripolyphosphate which represents a portion of the preferred product of the present process, has two known chystalline modifications, the so-called high temperature form, commonly denoted Form I, and the low temperature form, commonly denoted Form II. Under atmospheric pressure, these polymorphic forms are reported to be enantiotropic with a transition temperature at 400–470° C. By the present process, each form, or mixtures thereof, may be produced.

What is claimed is:

1. A process for producing granular admixtures of sulfate and phosphate salts which comprises: forming a dehydrated mixture by spray drying an aqueous solution, containing a ratio between about 1:9 to about 9:1 by weight, of sodium sulfate and orthophosphate salts selected from the group consisting of monosodium phosphate, disodium phosphate, and mixtures thereof having an $Na_2O:P_2O_5$ ratio of from about 1 to about 2 exclusive of sodium sulfate present, said spray drier having an inlet temperature in the range of from about 150° C. to about 500° C. and an outlet temperature in the range of from about 130° C. to about 160° C. and the surface temperature of the spray dried product not exceeding about 175° C., separating the fine particles of spray dried product having a size less than 150 microns from the coarse particles, hydrating the fine particles with water to a loss on ignition of between 10 and 50% and recombining the hydrated spray dried fine particles with the coarse particles to provide a conditioned feed which is passed directly to a zone for intermolecularly dehydrating said conditioned feed at a temperature between about 200° C. and about 500° C. to produce a granular product having a bulk density between about 25 and about 35 pounds per cubic foot.

2. The process of claim 1 wherein the spray dried product is hydrated to a loss on ignition from about 15 to about 35%.

3. The process of claim 1 wherein said $Na_2O:P_2O_5$ ratio is between about 1.67 and about 1.70.

4. The process of claim 1 wherein said conditioned feed is intermolecularly dehydrated by continuously feeding said conditioned feed to a dense fluidized bed of sodium tripolyphosphate maintained at a temperature between about 200° C. and about 500° C. while continuously withdrawing product from said fluidized bed at a substantially equivalent rate.

5. The process of claim 1 wherein the dehydrated spray dried mixture is cooled before being hydrated with water.

6 The process of claim 5 wherein the dehydrated spray dried mixture is cooled to below about 50° C.

7. The process of claim 4 wherein the condition feed is fed into the fluidized bed at a point below the surface of the bed.

8. The product of the process of claim 1.

9. A process for producing granular admixtures of sulfate and phosphate salts which comprises: forming a dehydrated mixture by spray drying an aqueous solution (A), containing a ratio between about 1:9 to about 9:1 by weight, of sodium sulfate and orthophosphate salts selected from the group consisting of monosodium phosphate, disodium phosphate, and mixtures thereof having an $Na_2O:P_2O_5$ ratio of from about 1 to about 2 exclusive of sodium sulfate present, said spray drier having an inlet temperature in the range of from about 150° C. to about 500° C. and an outlet temperature in the range of from about 130° C. to about 160° C. and the surface temperature of the spray dried product not exceeding about 175° C., separating the fine particles of spray dried product having a size less than 150 microns from the coarse particles, hydrating the fine particles with water to a loss on ignition of between 10 and 50% and recombining the hydrated spray dried fine particles with the coarse particles to provide a conditioned feed (B) which is passed directly to a zone where said conditioned feed (B) is mixed with an amount of said aqueous (A) sufficient to control the bulk density of the granular product between about 35 to about 70 pounds per cubic foot, and said mixture of (A) and (B) is intermolecular dehydrated at a temperature between 200° C. and about 500 ° C.

References Cited

UNITED STATES PATENTS

| | | | |
|---|---|---|---|
| 3,437,433 | 4/1969 | Sproul et al. | 23—106 |
| 3,397,948 | 8/1968 | Mesmer | 23—106 |
| 3,382,036 | 5/1968 | Post et al. | 23—106 |
| 3,368,978 | 2/1968 | Irani | 252—137 |
| 3,233,967 | 2/1966 | Shen | 23—106 |
| 2,668,147 | 2/1954 | Blaser et al. | 252—135 |

LEON D. ROSDOL, Primary Examiner

D. L. ALBRECHT, Assistant Examiner

U.S. Cl. X.R.

23—106, 107